(12) United States Patent
Oonishi et al.

(10) Patent No.: US 10,220,829 B2
(45) Date of Patent: Mar. 5, 2019

(54) HYBRID VEHICLE AND CONTROL METHOD THEREFOR

(71) Applicants:Kenji Oonishi, Toyota (JP); Koji Hokoi, Toyota (JP); Daisuke Itoyama, Toyota (JP); Hiroki Endo, Nissin (JP); Kazuma Aoki, Toyota (JP); Hideaki Yaguchi, Toyota (JP); Mikihisa Arai, Toyota (JP)

(72) Inventors: Kenji Oonishi, Toyota (JP); Koji Hokoi, Toyota (JP); Daisuke Itoyama, Toyota (JP); Hiroki Endo, Nissin (JP); Kazuma Aoki, Toyota (JP); Hideaki Yaguchi, Toyota (JP); Mikihisa Arai, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 230 days.

(21) Appl. No.: 14/988,207

(22) Filed: Jan. 5, 2016

(65) Prior Publication Data

US 2016/0129902 A1    May 12, 2016

Related U.S. Application Data

(62) Division of application No. 14/219,428, filed on Mar. 19, 2014, now Pat. No. 9,630,615.

(30) Foreign Application Priority Data

Mar. 21, 2013  (JP) .................................. 2013-057486

(51) Int. Cl.
*B60L 9/00*     (2006.01)
*B60W 20/15*    (2016.01)
(Continued)

(52) U.S. Cl.
CPC ............... *B60W 20/15* (2016.01); *B60K 6/20* (2013.01); *B60W 10/08* (2013.01); *B60W 20/18* (2016.01);
(Continued)

(58) Field of Classification Search
CPC ...... B60W 20/00; B60W 20/15; B60W 20/18; B60W 20/40; B60W 20/50; B60W 20/082
(Continued)

(56) References Cited

U.S. PATENT DOCUMENTS 7,980,342 B2     7/2011  Andri
2009/0321159 A1  12/2009 Andri
(Continued)

FOREIGN PATENT DOCUMENTS

CN    102923016 A     2/2013
EP    2599654 A1      6/2013
(Continued)

OTHER PUBLICATIONS

Communication from United States Patent and Trademark Office dated Apr. 27, 2015 in U.S. Appl. No. 14/254,064.
(Continued)

*Primary Examiner* — Thomas G Black
*Assistant Examiner* — Luat T Huynh
(74) *Attorney, Agent, or Firm* — Sughrue Mion, PLLC

(57) ABSTRACT

A hybrid vehicle includes: an engine configured to output power for traveling; a motor configured to output power for traveling; a switch configured to set a fuel economy priority mode, in which priority is given to fuel economy, and to cancel the fuel economy priority mode; and a controller configured (a) to operate the engine and the motor based on the switch setting; (b) to determine the presence/absence of degradation of fuel supplied to the engine; and (c) to prohibit setting of the fuel economy priority mode by the switch (Continued)

subsequently when determination is made that the fuel has degraded when the hybrid vehicle travels using power of the motor in a state in which the drive of the engine is stopped.

4 Claims, 5 Drawing Sheets

(51) Int. Cl.
| | |
|---|---|
| *B60W 20/40* | (2016.01) |
| *B60W 50/08* | (2012.01) |
| *B60W 20/50* | (2016.01) |
| *B60W 20/18* | (2016.01) |
| *B60K 6/20* | (2007.10) |
| *B60W 10/08* | (2006.01) |

(52) U.S. Cl.
CPC ............ *B60W 20/40* (2013.01); *B60W 20/50* (2013.01); *B60W 50/082* (2013.01); *B60W 2400/00* (2013.01); *B60W 2560/04* (2013.01); *B60W 2710/08* (2013.01); *B60Y 2300/182* (2013.01); *Y02T 10/6239* (2013.01); *Y02T 10/6286* (2013.01); *Y02T 10/7077* (2013.01); *Y02T 10/84* (2013.01); *Y10S 903/902* (2013.01); *Y10S 903/93* (2013.01)

(58) Field of Classification Search
USPC .......................................................... 701/22
See application file for complete search history.

(56) References Cited

U.S. PATENT DOCUMENTS

| | | | |
|---|---|---|---|
| 2010/0312425 | A1 | 12/2010 | Obayashi et al. |
| 2011/0048671 | A1 | 3/2011 | Nisbikawa et al. |
| 2011/0166729 | A1 | 7/2011 | Tabatowski-Bush |
| 2013/0041534 | A1* | 2/2013 | Kim ..................... B60W 10/08 701/22 |
| 2013/0151056 | A1* | 6/2013 | Nakano ................... B60K 6/46 701/22 |
| 2013/0211641 | A1* | 8/2013 | Fujii ..................... B60W 10/06 701/22 |
| 2013/0253743 | A1* | 9/2013 | Maruyama ............. B60K 6/445 701/22 |
| 2014/0114511 | A1* | 4/2014 | Sangameswaran ... B60W 10/06 701/22 |
| 2014/0288740 | A1 | 9/2014 | Itoyama et al. |
| 2014/0288741 | A1 | 9/2014 | Oonishi et al. |
| 2014/0316624 | A1 | 10/2014 | Aoki |

FOREIGN PATENT DOCUMENTS

| | | |
|---|---|---|
| EP | 2619024 B1 | 12/2014 |
| JP | 2008-296646 A | 12/2008 |
| JP | 2009-255680 A | 11/2009 |
| JP | 2010018128 A | 1/2010 |
| JP | 2010-280335 A | 12/2010 |
| JP | 2011235849 A | 11/2011 |
| JP | 2012-030668 A | 2/2012 |
| JP | 2012-66716 A | 4/2012 |
| JP | 2012-166777 A | 9/2012 |
| WO | 2009/128355 A1 | 10/2009 |
| WO | 2012/014845 A1 | 2/2012 |

OTHER PUBLICATIONS

Communication from United States Patent and Trademark Office dated Nov. 25, 2015 in U.S. Appl. No. 14/254,064.
Communication from United States Patent and Trademark Office dated Mar. 23, 2016 in U.S. Appl. No. 14/219,428.
Communication dated Jun. 1, 2016, issued by the U.S. Patent and Trademark Office in U.S. Appl. No. 14/219,428.
Communication dated Jun. 30, 2016 from U.S. Patent & Trademark Office in counterpart U.S. Appl. No. 14/254,064.
Communication dated Aug. 9, 2016 from U.S. Patent & Trademark Office in counterpart U.S. Appl. No. 14/219,428.
Notice of Allowance dated Nov. 14, 2016, which issued during the prosecution of U.S. Appl. No. 14/254,064.
Notice of Allowance dated Feb. 1, 2017, which issued during the prosecution of U.S. Appl. No. 14/254,064.
Communication dated Dec. 30, 2016, from the United States Patent and Trademark Office in counterpart U.S. Appl. No. 14/219,428.

* cited by examiner

HYBRID VEHICLE AND CONTROL METHOD THEREFOR

CROSS-REFERENCE TO RELATED APPLICATIONS

This is a divisional application of U.S. application Ser. No. 14/219,428 filed Mar. 19, 2014, which claims priority from Japanese Patent Application No. 2013-057486 filed on Mar. 21, 2013; the entire disclosures of the prior applications are considered part of the disclosure of the accompanying divisional application, and are hereby incorporated by reference.

BACKGROUND OF THE INVENTION

1. Field of the Invention

The invention relates to a hybrid vehicle (HV) and a control method therefor. More specifically, the invention relates to a hybrid vehicle equipped with a switch implementing switching between setting and canceling a fuel economy priority mode, in which priority is given to fuel efficiency, and a control method for such a hybrid vehicle.

2. Description of Related Art

A hybrid vehicle of this type has been suggested in which when the degradation degree of fuel supplied to an engine is determined to be high, the required load which is required for the engine is increased and the consumption of the fuel with a high degradation degree is enhanced (see, for example, Japanese Patent Application Publication No. 2009-255680 (JP 2009-255680 A)). In such a hybrid vehicle, where the fuel degradation degree is determined to be high in a motor drive mode in which the engine drive is stopped and the vehicle travels using power only from a motor, the engine is started and the consumption of the fuel with a high degradation degree is enhanced.

Further, it has also been suggested to make a transition to a fuel consumption enhancement mode in which the period in which the engine is driven is extended when the fuel supplied to the engine is determined to have degraded and the remaining amount of the fuel is equal to or higher than a threshold (see, for example, Japanese Patent Application Publication No. 2012-030668 (JP 2012-030668 A)). In such a hybrid vehicle, the degraded fuel is rapidly consumed due to the transition to the fuel consumption enhancement mode.

It has recently been suggested to provide a hybrid vehicle with a switch for setting a fuel economy priority mode in which priority is given to fuel efficiency as compared with the usual travel mode, or to give priority to a motor drive mode, in which the engine is not started till the battery is charged by electric power from an external electric power source and the cumulative capacity of the battery becomes sufficient to start the engine. In such hybrid vehicles, it should be determined how to handle the setting of the fuel economy priority mode when fuel degradation is determined.

SUMMARY OF THE INVENTION

The hybrid vehicle and control method therefor of the invention suggest how to handle the fuel economy priority mode when it is determined that the fuel supplied to the engine has degraded.

According to a first aspect of the invention, a hybrid vehicle includes: an engine configured to output power for traveling; a motor configured to output power for traveling; a switch configured to set a fuel economy priority mode, in which priority is given to fuel economy, and to cancel the fuel economy priority mode; and a controller configured (a) to operate the engine and the motor based on the switch setting; (b) to determine the presence/absence of degradation of fuel supplied to the engine; and (c) to prohibit setting of the fuel economy priority mode by the switch subsequently to when determination is made that the fuel has degraded when the hybrid vehicle travels using power of the motor in a state in which the drive of the engine is stopped.

In the hybrid vehicle of the first aspect, when the fuel supplied to the engine in the motor drive mode is determined to have degraded, subsequent setting of the fuel economy priority mode with the mode setting-canceling switch is prohibited. When the fuel is determined in the motor drive mode to have degraded, the consumption of the degraded fuel is enhanced by starting the engine, but where a fuel economy priority mode is set, since priority is given to fuel economy, the drive of the started engine can be stopped and a transition can be made to the motor drive mode. In such a case, the consumption of the degraded fuel is inhibited. In the hybrid vehicle of the first aspect, the drive of the started engine can be maintained and the consumption of the degraded fuel can be enhanced by prohibiting setting of the fuel economy priority mode subsequently when determination is made in the motor drive mode that the fuel has degraded.

In the hybrid vehicle of the first aspect, the controller may cancel the fuel economy priority mode where it is determined that the fuel has degraded when the hybrid vehicle travels using power of the motor in a state in which the fuel economy priority mode has been set by the switch. In such a case, by canceling the fuel economy priority mode that has already been set, it is possible prevent the engine, which has been started by the execution of the motor drive mode giving priority to fuel economy, from stopping. As a result, the drive of the engine is continued and the consumption of the degraded fuel is enhanced.

According to a second aspect of the invention, a control method for a hybrid vehicle includes: an engine configured to output power for traveling; a motor configured to output power for traveling; a switch configured to set a fuel economy priority mode, in which priority is given to fuel economy, and to cancel the fuel economy priority mode; and a controller, this control method including: operating the controller to drive the engine and the motor based on the switch setting; operating the controller to determine the presence/absence of degradation of fuel supplied to the engine; and operating the controller to prohibit setting of the fuel economy priority mode by the switch subsequently to when determination is made that the fuel has degraded when the hybrid vehicle travels using power of the motor in a state in which the drive of the engine is stopped.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
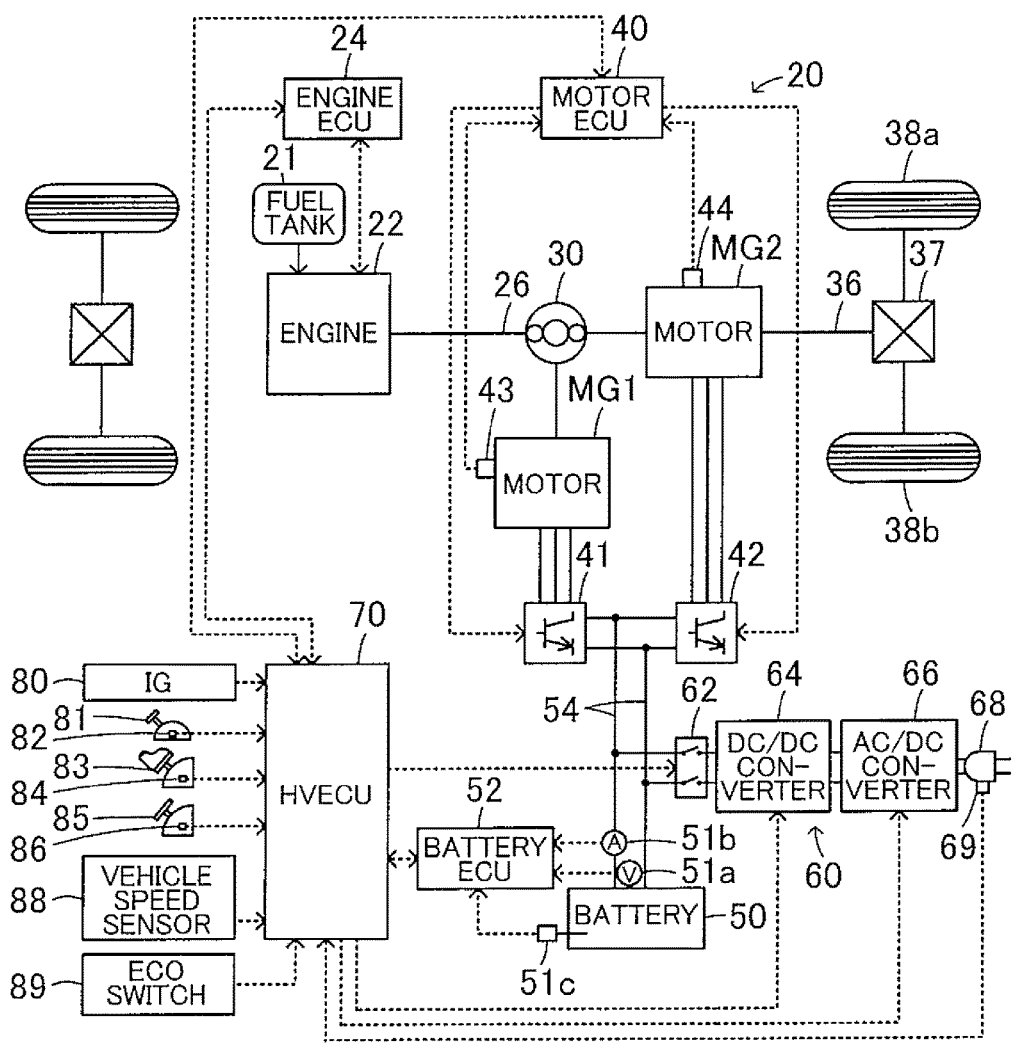
FIG. 1 is a configuration diagram illustrating schematically the configuration of a hybrid automobile as an embodiment of the invention.

A mode for carrying out the invention is explained below on the basis of an embodiment thereof. FIG. 1 is a configuration diagram illustrating schematically the configuration of a hybrid automobile 20 as an embodiment of the invention. As shown in the figure, the hybrid automobile 20 includes the following: an engine 22 that receives the supply of fuel such as gasoline or light oil from a fuel tank 21 and outputs power; an engine electronic control unit (ECU) (referred to hereinbelow as engine ECU) 24 that performs drive control of the engine 22; a planetary gear 30 in which a carrier is connected to a crankshaft 26 of the engine 22, and a ring gear is connected to a drive axle 36 linked by means of a differential gear 37 to drive wheels 38a, 38b; a motor MG1 constituted, for example, by a synchronous motor generator and connected by a rotor to a sun gear of the planetary gear 30; a motor MG2 constituted, for example, as a synchronous motor generator and connected by a rotor to the drive axle 36; inverters 41, 42 for driving the motors MG1, MG2; a motor ECU 40 that performs drive control of the motors MG1, MG2 by switch controlling switching elements (not shown in the figure) of the inverters 41, 42; a battery 50 that is configured, for example, as a lithium ion secondary battery and that exchanges electric power with the motors MG1, MG2 via the inverters 41, 42; a battery ECU 52 that manages the battery 50; a charger 60 that is connected to an external electric power source such as a household power source and can charge the battery 50; and a hybrid ECU (referred to hereinbelow as HVECU) 70 that controls the entire vehicle.

The engine ECU 24 is configured as a microprocessor centered on a central processing unit (CPU) (this configuration is not shown in the figure), and is provided, in addition to the CPU, with a read-only memory (ROM) that stores a processing program, a random access memory (RAM) for temporarily storing data, input/output ports, and a communication port. Signals from various sensors detecting the drive state of the engine 22 are input via the input port into the engine ECU 24. Examples of the signals include a crank position $\theta cr$ from a crank position sensor that detects the rotation position of the crankshaft 26; a cooling water temperature Tw from a water temperature sensor that detects the temperature of cooling water in the engine 22; a pressure Pin inside a cylinder from a pressure sensor attached inside a combustion chamber; a cam position $\theta ca$ from a cam position sensor that detects the rotation position of a camshaft that opens and closes an intake valve and an exhaust valve that perform intake and exhaust to and from the combustion chamber; a throttle position TP from a throttle position sensor that detects the position of a throttle valve; an intake air amount Qa from an air flow meter mounted on an intake pipe; an intake temperature Ta from a temperature sensor also mounted on the intake pipe; an air-fuel ratio AF from an air-fuel sensor mounted on an exhaust system; and an oxygen signal O2 from an oxygen sensor also mounted on the exhaust system. A variety of control signals for driving the engine 22 are output from the engine ECU 24 via the output port. Examples of such signals include a drive signal to fuel injection valves, a drive signal to a throttle motor that adjusts the throttle valve position; a control signal to an ignition coil integrated with an igniter, and a control signal to a variable valve timing mechanism that can change the opening-closing timing of the intake valve. Further, the engine ECU 24 communicates with the HVECU 70, performs drive control of the engine 22 by a control signal from the HVECU 70, and outputs, as necessary, data relating to the drive state of the engine 22 to the HVECU 70. The engine ECU 24 also calculates the rotation speed of the crankshaft 26, that is, the rotation speed Ne of the engine 22, on the basis of a signal from the crank position sensor (not shown in the figure) mounted on the crankshaft 26.

The motor ECU 40 is configured as a microprocessor centered on a CPU (this configuration is not shown in the figure) and is provided, in addition to the CPU, with a ROM that stores a processing program, a RAM for temporarily storing data, input/output port, and a communication port. Signals necessary for performing drive control of the motors MG1, MG2 are input via the input port into the motor ECU 40. Examples of such signals include rotation positions $\theta m1$, $\theta m2$ from the rotation position detection sensors 43, 44 that detect the rotation positions of the rotors of the motors MG1, MG2, and phase currents applied to the motors MG1, MG2, which are detected by current sensors (not shown in the figure). Switching control signals to the switching elements (not shown in the figure) of the inverters 41, 42 are output via the output port from the motor ECU 40. The motor ECU 40 also communicates with the HVECU 70, performs drive control of the motors MG1, MG2 by the control signals from the HVECU 70, and outputs, as necessary, data relating to the drive state of the motors MG1, MG2 to the HVECU 70. The motor ECU 40 also calculates the rotation angle speed $\omega m1$, $\omega m2$ and rotation speed Nm1, Nm2 of the motors MG1, MG2 on the basis of the rotation positions $\theta m1$, $\theta m2$ of the motors MG1, MG2 from the rotation position detection sensors 43, 44.

The battery ECU 52 is configured as a microprocessor centered on a CPU (this configuration is not shown in the figure) and is provided, in addition to the CPU, with a ROM that stores a processing program, a RAM for temporarily storing data, input/output ports, and a communication port. Signals necessary for managing the battery 50 are input via the input port into the battery ECU 52. Examples of such signals include a terminal voltage (battery voltage) Vb from a voltage sensor 51a disposed between the terminals of the battery 50, a charge-discharge current Ib from a current sensor 51b mounted on an electric power line connected to the output terminals of the battery 50, and a battery temperature Tb from a temperature sensor 51c mounted on the battery 50. Data relating to the state of the battery 50 are transmitted, as necessary, by communication to the HVECU 70. In order to manage the battery 50, the battery ECU 52 calculates an electric power storage ratio state of charge (SOC), which is a ratio of the capacity of the electric power dischargeable from the battery 50 at this time to the total capacity on the basis of the integral value of the charge-discharge current Ib detected by the current sensor 51b, or calculates the input and output limits Win, Wout, which are allowable input and output electric power that may be charged into and discharged from the battery 50 on the basis of the calculated electric power storage ratio SOC and the battery temperature Tb. The input and output limits Win, Wout of the battery 50 can be set by setting the basic values of the input and output limits Win, Wout on the basis of the battery temperature Tb, setting an output limit correction factor and an input limit correction factor on the basis of the electric power storage ratio SOC of the battery 50, and multiplying the basic values of the input and output limits Win, Wout, which have been set, by the correction factors.

The charger 60 is connected via a relay 62 to an electric power line 54 connecting the inverters 41, 42 with the battery 50. The charger 60 is provided with an alternating current/direct current (AC/DC) converter 66 that converts AC power from an external electric power source that is supplied via an electric power supply plug 68 into DC power, and a DC/DC converter 64 that converts the voltage of the DC power from the AC/DC converter 66 and supplies the converted voltage to the electric power line 54.

The HVECU 70 is configured as a microprocessor centered on a CPU (this configuration is not shown in the figure) and is provided, in addition to the CPU, with a ROM that stores a processing program, a RAM for temporarily storing data, input/output ports, and a communication port. The following signals are input into the HVECU 70 via the input port: a connection detection signal from a connection detection sensor 69 that detects the connection of the electric power supply plug 68 to the external electric power supply, an ignition signal from an ignition switch 80, a shift position (SP) from a SP sensor 82 that detects the operation position of a shift lever 81, an accelerator depression amount Acc from an accelerator pedal position sensor 84 that detects the depression amount of an accelerator pedal 83, a brake pedal position (BP) from a BP sensor 86 that detects the depression amount of a brake pedal 85, a vehicle speed V from a vehicle speed sensor 88, and an eco switch signal ECO from an eco switch 89 that sets a fuel economy priority mode (eco mode) in which priority is given to fuel economy when the vehicle travels. As mentioned hereinabove, the HVECU 70 is connected via the communication port to the engine ECU 24, motor ECU 40, and battery ECU 52 and exchanges various control signals and data with the engine ECU 24, motor ECU 40, and battery ECU 52.

In the hybrid automobile 20 of the embodiment having such a configuration, a required torque Tr* that should be output to the drive axle 36 is calculated on the basis of the vehicle speed V and the accelerator depression amount Acc corresponding to the amount of depression of the accelerator pedal by the driver. The drive control of the engine 22 and the motors MG1 and MG2 is performed such that the required power corresponding to the required torque Tr* is output to the drive axle 36. The drive control of the engine 22 and the motors MG1 and MG2 can be performed in a torque conversion drive mode, a charge-discharge drive mode, and a motor drive mode. In the torque conversion drive mode, the drive control of the engine 22 is performed such that the mechanical power matching the required mechanical power is output from the engine 22, and the drive control of the motor MG1 and the motor MG2 is performed such that the entire mechanical power output from the engine 22 is subjected to torque conversion by the planetary gear 30, the motor MG1, and the motor MG2, and the torque-converted power is output to the drive axle 36. In the charge-discharge drive mode, the drive control of the engine 22 is performed such that the mechanical power matching a sum of the required mechanical power and the electric power necessary for charging and discharging the battery 50 is output from the engine 22. Further, the drive control of the motor MG1 and the motor MG2 is performed such that the required mechanical power is output to the drive axle 36 as the battery 50 is charged and discharged and also as the entire mechanical power output from the engine 22 or part of the output mechanical power is subjected to torque conversion by the planetary gear 30, the motor MG1, and the motor MG2. In the motor drive mode, drive control is performed such that the drive of the engine 22 is stopped and the power matching the required power from the motor MG2 is output to the drive axle 36. Further, both in the torque conversion drive mode and in the charge-discharge drive mode, the engine 22, the motor MG1, and the motor MG2 are controlled such that the required power is output to the drive axle 36 as the engine 22 is driven, and the two control modes are not substantially different from each other. Accordingly, the two modes will be together referred to hereinbelow as an engine drive mode.

In the engine drive mode, the HVECU 70 sets the required torque Tr* which is required for traveling (should be output to the drive axle 36) on the basis of the accelerator depression amount Acc from the accelerator pedal position sensor 84 and the vehicle speed V from the vehicle speed sensor 88. Traveling power Pdrv*, which is required for traveling, is then calculated by multiplying the required torque Tr*, which has been set, by the rotation speed Nr (for example, a rotation speed Nm2 of the motor MG2 or the rotation speed obtained by multiplying the vehicle speed V by a recalculation factor) of the drive axle 36. Required power Pe*, which is required for the vehicle (should be output from the engine 22) is then set by subtracting charge-discharge required power Pb* (a positive value when the battery 50 is discharged) of the battery 50, which is based on the power storage ratio SOC of the battery 50, from the calculated traveling power Pdrv*. A target rotation speed Ne* and a target torque Te* of the engine 22 are then set by using on operation line (for example, a fuel consumption optimum operation line) as a relationship between the rotation speed Ne and torque Te of the engine 22 at which the required power Pe* can be efficiently output from the engine 22. A drive point constituted by the target rotation speed Ne* and target torque Te* based on the required power Pe* and operation line is referred to hereinbelow as a fuel consumption drive point. A torque command Tm1* of the motor MG1 is then set by rotation speed feedback control such that the rotation speed Ne of the engine 22 becomes the target rotation speed Ne* within the range of the input/output limits Win, Wout of the battery 50. Also, a torque command Tm2* of the motor MG2 is set by subtracting a torque acting upon the drive axle 36 via the planetary gear 30 when the motor MG1 is driven according to the torque command Tm1* from the required torque Tr*. The target rotation speed Ne* and target torque Te*, which have been set, are transmitted to the engine ECU 24, and the torque commands Tm1*, Tm2* are transmitted to the motor ECU 40. The engine ECU 24 that has received the target rotation speed Ne* and target torque Te* performs the intake air amount control, fuel injection control, and ignition control of the engine 22 such that the engine 22 is driven at the target rotation speed Ne* and target torque Te*. The motor ECU 40 that has received the torque commands Tm1*, Tm2* performs switching control of the switching elements of the inverters 41, 42 such that the motors MG1, MG2 are driven according to the torque commands Tm1*, Tm2*. Because of such control, the required torque Tr* can be output to the drive axle 36 to run the vehicle within the range of input/output limits Win, Wout of the battery 50, while the engine 22 is driven with good efficiency. In the engine drive mode, when the stopping condition of the engine 22, such as the condition of the required power Pe* of the engine 22 getting equal to or lower than a stop threshold Pstop, is fulfilled the drive of the engine 22 is stopped and a transition is made to the motor drive mode. The stop threshold Pstop is set as the upper limit of the range of the required power Pe* in which it is better to stop the drive of the engine 22.

In the motor drive mode, the HVECU 70 sets the required torque Tr* on the basis of the accelerator depression amount Acc and vehicle speed V, sets a value 0 for the torque command Tm1* of the motor MG1, sets the torque command Tm2* of the motor MG2 such that the required torque Tr* is output to the drive axle 36 within the range of input/output limits Win, Wout of the battery 50, and transmits the settings to the motor ECU 40. The motor ECU 40 that has received the torque commands Tm1*, Tm2* performs switching control of the switching elements of the inverters 41, 42 such that the motors MG1, MG2 are driven according to the torque commands Tm1*, Tm2*. Because of such control, the required torque Tr* can be output to the drive axle 36 to run the vehicle within the range of input/output limits Win, Wout of the battery 50 in a state in which the drive of the engine 22 is stopped. In such a motor drive mode, when the starting condition for the engine 22, such as the required power Pe* of the engine 22 getting equal to or higher than a start threshold Pstart, is fulfilled, the engine 22 is started and a transition is made to the engine drive mode. The required power Pe* of the engine 22 is obtained by subtracting the charge-discharge required power Pb* of the battery 50 from the traveling power Prdrv* obtained by multiplying the required torque Tr* by the rotation speed Nr of the drive axle 36. The start threshold Pstart is set as the lower limit of the range of the required power Pe* in which it is better to start the engine 22.

Further, with the hybrid automobile 20 of the embodiment, the vehicle is stopped at a home or predetermined charging location, the electric power supply plug 68 is connected to the external electric power source, the charger 60 is controlled, and the battery 50 is charged by the electric power from the external electric power source. After the battery 50 has been charged, till the electric power storage ratio SOC of the battery 50 reaches a threshold Shv (for example, 20% or 30%) that has been set to a level at which the engine 22 can be started, the vehicle is run in a motor drive priority mode. After the electric power storage ratio SOC of the battery 50 has reached the threshold Shv, the vehicle is run in a hybrid drive priority mode. The motor drive priority mode, as referred to herein, is a mode in which the vehicle is run by prioritizing motor drive that uses only power from the motor MG2, as compared with the hybrid drive mode that uses both of the power from the engine 22 and the power from the motor MG2. The hybrid drive priority mode is a mode in which priority is given to hybrid drive over the motor drive.

Further, in the hybrid automobile 20 of the embodiment, switching between the usual travel mode and the fuel economy priority travel mode (eco mode) is performed by operating the eco switch 89. The usual travel mode as referred to herein is a mode in which the vehicle is run with consideration for fuel economy and comfort. The fuel economy priority travel mode (eco mode) is a travel mode in which priority is given to fuel economy, even if the drive characteristics are degraded by comparison with those in the usual travel mode. In the eco mode, the HVECU 70 performs the drive control of the engine 22 and the motors MG1, MG2, for example, such that the required torque Tr corresponding to the accelerator depression amount Acc is decreased, or the variation amount of the required torque Tr* or travel power Pdrv* per unit time is reduced and limited, or the upper limit value of the required torque Tr* or travel power Pdrv* is reduced by comparison with that in the usual travel mode. Therefore, where the eco switch 89 is switched ON and the eco mode is set in the motor drive priority mode after the battery 50 has been charged by the external electric power source, before the electric power storage ratio SOC of the battery 50 reaches the threshold Shv, the engine 22 is not started as long as the accelerator pedal 83 is not strongly depressed (for example, the depression amount at which the accelerator depression amount Acc is equal to greater than 90% in the usual travel mode).

Figure 2:
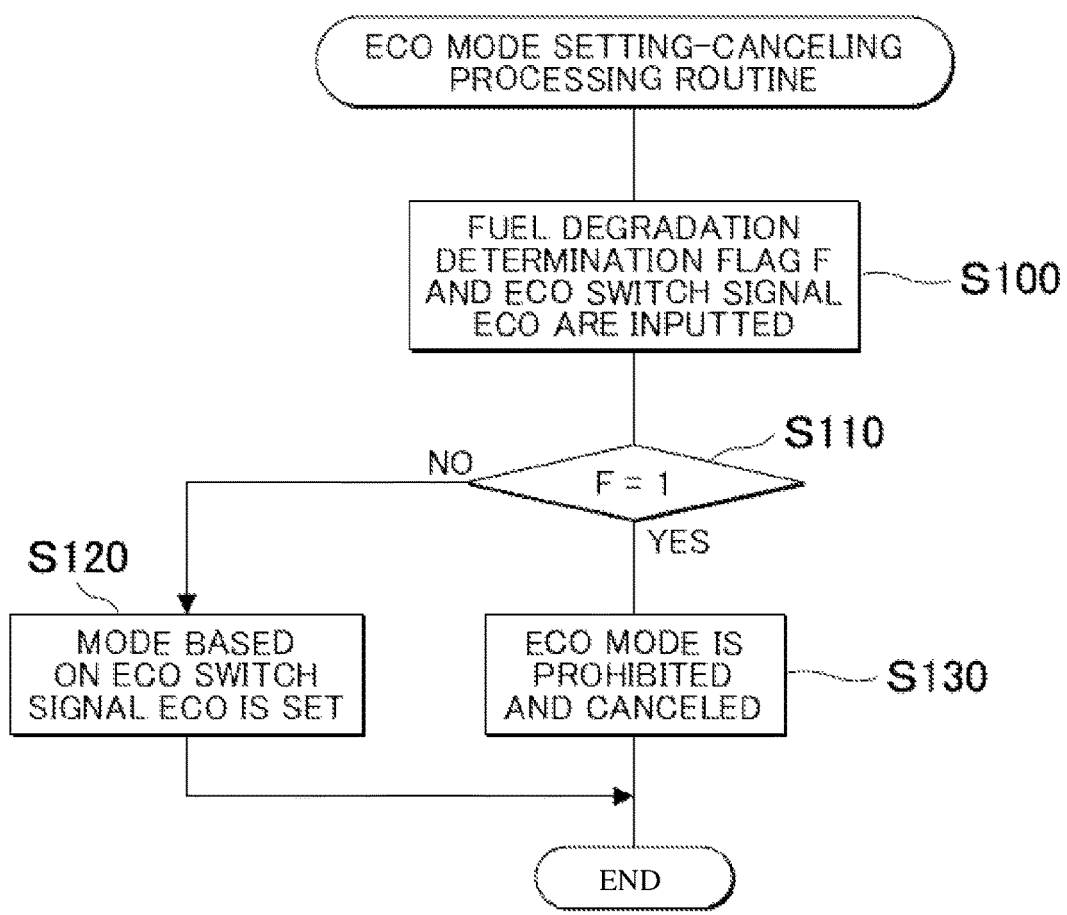
FIG. 2 is a flowchart illustrating an example of an eco mode setting and canceling processing routine executed by a HVECU of the embodiment.

The operation of the hybrid automobile 20 of the embodiment that has the above-described configuration, in particular the operation performed when the fuel of the engine 22 has degraded, is explained below. FIG. 2 is a flowchart illustrating an example of an eco mode setting and canceling processing routine executed by the HVECU 70 of the embodiment. This routine is repeatedly executed with a predetermined period (for example, every several milliseconds or every several tens of milliseconds) after the system has been started.

Where the eco mode setting and canceling processing routine is executed, first, the processing of inputting a fuel degradation determination flag F and an eco switch signal ECO from the eco switch 89 is executed (step S100). In the fuel degradation determination flag F, a value of 0 is held as the initial value when the fuel supplied to the engine 22 is not degraded, and a value of 1 is set when the fuel has degraded. Whether or not the fuel has degraded can be determined, for example, on the basis of whether or not a predetermined period of time (for example, several months to about one year) has passed since the previous refueling. In the hybrid automobile 20 of the embodiment, the battery 50 can be charged using electric power from an external electric power source such as a household electric power source. Therefore, when the automobile is driven only short distances (short-distance running and charging of the battery 50 are repeated), the fuel in the fuel tank 21 is not consumed for a comparatively long period and the fuel can degrade. Therefore, the determination of such fuel degradation is performed. In the embodiment, where it is determined that the fuel has degraded when the drive of the engine 22 is stopped, the engine 22 is started by fuel degradation drive control (not shown in the figure), and the consumption of the degraded fuel is enhanced.

The value of the input fuel degradation determination flag F is then examined (step S110), and when the fuel degradation determination flag F has a value of 0, the fuel is not degraded. Therefore, a mode based on the eco switch signal ECO is set. Thus, when the echo switch signal ECO is ON, the eco mode is set, and when the eco switch signal ECO is OFF, the usual travel mode is set (step S120) and the routine is ended.

Meanwhile, when the fuel degradation determination flag F has a value of 1, it is determined that the fuel has degraded. Therefore, subsequent setting of the eco mode by the eco switch 89 is prohibited, and where the eco mode has already been set by this time, the eco mode is canceled, the usual travel mode is implemented (step S130), and the routine is ended. The Purpose of prohibition of the subsequent eco mode or the cancellation of the eco mode that has been set, in a case where it is determined that the fuel has degraded, is to prevent the drive of the engine 22 from being stopped due to prioritizing the motor drive by the eco mode setting even when the engine 22 is started following the determination of fuel degradation. As a result, the consumption of the degraded fuel can be enhanced.

With the above-described hybrid automobile 20 of the embodiment, when it is determined in the motor drive mode that the fuel has degraded and the fuel degradation determination flag F is set to a value of 1, subsequent setting of the eco mode is prohibited, the setting of the eco mode that has already been set by this time is canceled, and the usual travel mode is implemented. Because of this, the engine 22, which has been started resulting from the execution of the motor drive mode that gives priority to fuel economy by setting the eco mode, can be prevented from stopping, As a result, the drive of the started engine is maintained and the consumption of the degraded fuel can be enhanced.

In the hybrid automobile 20 of the embodiment, when it is determined in the motor drive mode that the fuel has degraded, the subsequent eco mode is prohibited and the eco mode that has already been set by this time is canceled. However, when it is determined in the motor drive mode that the fuel has degraded, either the prohibition of the subsequent eco mode or cancellation of the eco mode that has already been set by this time may be implemented.

In the hybrid automobile 20 of the embodiment, the charger 60 is provided for charging the battery 50 by using an external electric power source. However, the invention is also applicable to a hybrid vehicle that is not provided with the charger 60.

Figure 3:
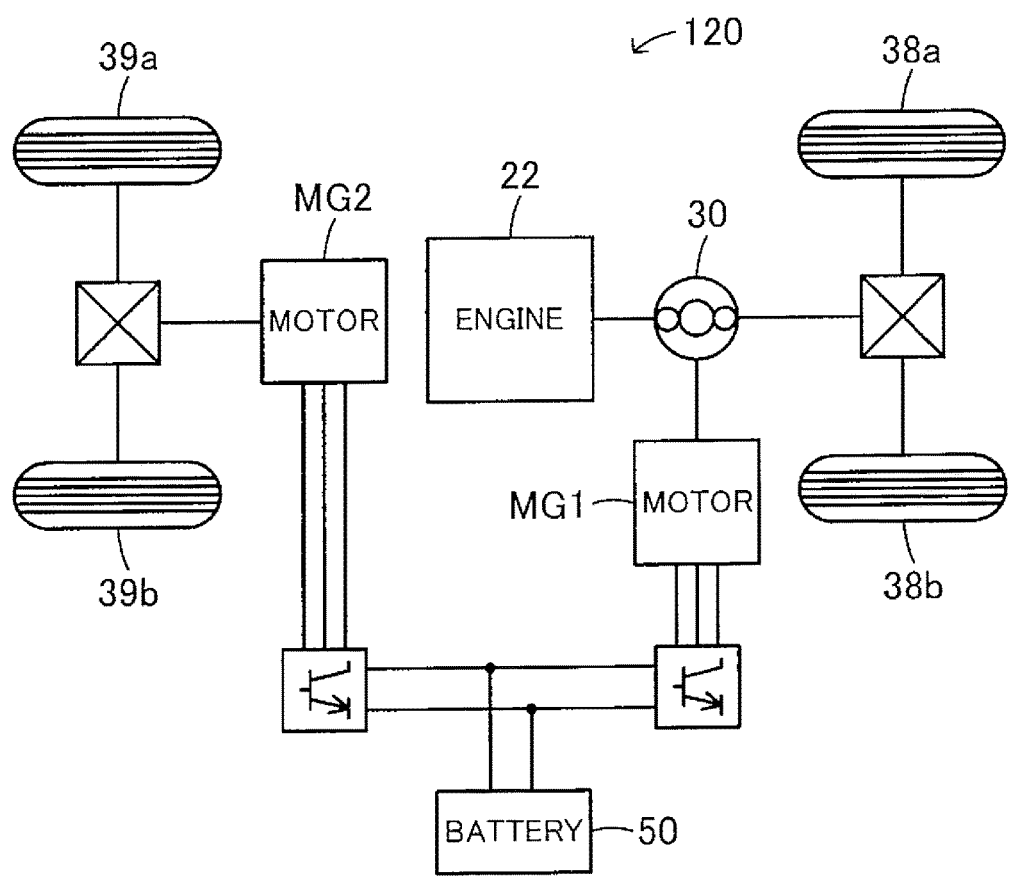
FIG. 3 is a configuration diagram illustrating schematically the configuration of a hybrid automobile of a variation example.

In the hybrid automobile 20 of the embodiment, the power from the motor MG2 is output to the drive axle 36 connected to the drive wheels 38a, 38b. Alternatively, the power from the motor MG2 may be output to an axle (axle connected to wheels 39a, 39b in FIG. 3) other than the axle (axle connected to the drive wheels 38a, 38b) connected to the drive axle 36, as exemplified by a hybrid automobile 120 of the variation example shown in FIG. 3.

Figure 4:
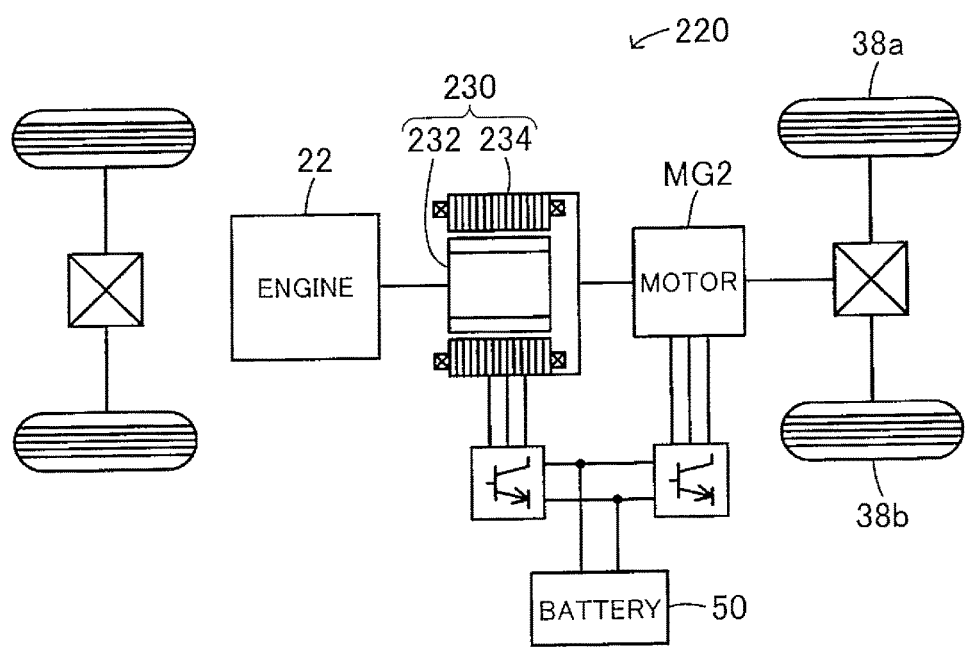
FIG. 4 is a configuration diagram illustrating schematically the configuration of a hybrid automobile of a variation example.

In the hybrid automobile 20 of the embodiment, the power from the engine 22 is output via the planetary gear 30 to the drive axle 36 connected to the drive wheels 38a, 38b. Alternatively, a twin-rotor electric motor 230 may be provided which has an inner rotor 232 connected to the crankshaft of the engine 22 and an outer rotor 234 connected to the drive axle 36 connected to the drive wheels 38a, 38b and which transfers part of the mechanical power from the engine 22 to the drive axle 36 and converts the remaining mechanical power into electric power, as exemplified by a hybrid automobile 220 of the variation example shown in FIG. 4.

Figure 5:
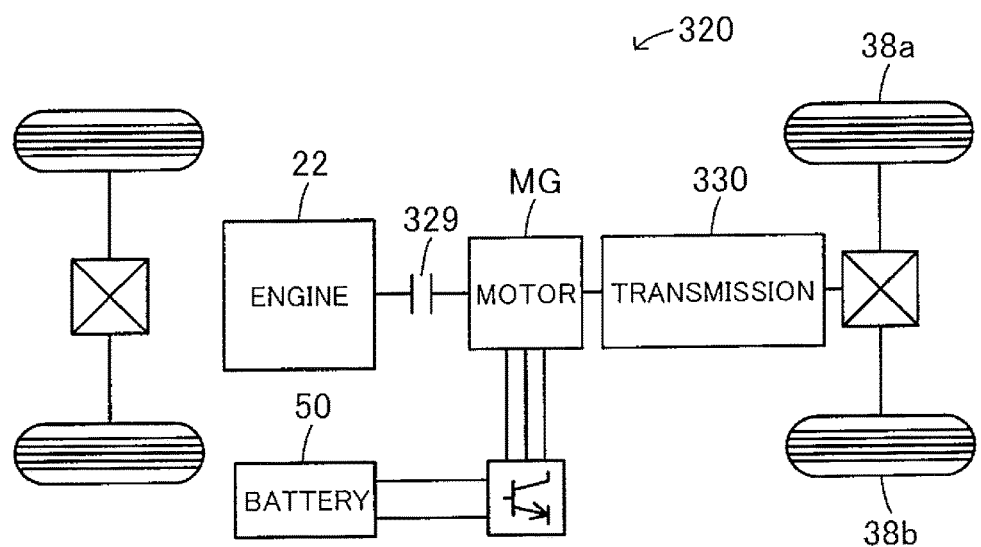
FIG. 5 is a configuration diagram illustrating schematically the configuration of a hybrid automobile of a variation example.

In the hybrid automobile 20 of the embodiment, the power from the engine 22 is output via the planetary gear 30 to the drive axle 36 connected to the drive wheels 38a, 38b, and the power from the motor MG2 is also output to the drive axle 36. Alternatively, the configuration may be used in which a motor MG is attached via a transmission 330 to the drive axle 36 connected to the drive wheels 38a, 38b, and the engine 22 is connected via a clutch 329 to the rotating shaft of the motor MG, as exemplified by a hybrid automobile 320 of the variation example shown in FIG. 5. With such a configuration, the power from the engine 22 may be output to the drive axle 36 via the rotating shaft of the motor MG and the transmission 330, and the power from the motor MG may be output to the drive axle via the transmission 330.

The correspondence relationship between the main elements in the embodiment and the main elements of the invention is explained below. In the embodiment, the engine 22 corresponds to the "engine", the motor MG2 corresponds to the "motor", the eco switch 89 corresponds to the "switch", and the HVECU 70, engine ECU 24, and motor ECU 40 each correspond to the "controller".

In the correspondence relationship between the main elements in the embodiment and the main elements of the invention, the embodiment is merely an example for explaining a specific mode for carrying out the invention. Therefore, the elements of the embodiment place no limitation on the elements of the invention. Thus, the invention should be interpreted on the basis of the description thereof, and the embodiment is merely a specific example of the invention.

The mode for carrying out the invention is explained hereinabove by using the embodiment, but the invention is obviously not limited to the embodiment and can be implemented in a variety of forms without departing from the essence of the invention.

What is claimed is:
1. A hybrid vehicle comprising:
an engine configured to output power for traveling;
a motor configured to output power for traveling;
a switch configured to set a fuel economy priority mode, in which priority is given to fuel economy, and to cancel the fuel economy priority mode; and
a controller configured to:
(a) operate the engine and the motor based on the switch setting;
(b) determine whether or not a fuel supplied to the engine is degraded; and
(c) prohibit setting the fuel economy priority mode in response to operation of the switch after the controller determines that the fuel supplied to the engine is degraded,
wherein, when the fuel economy priority mode is set, an amount of a required torque corresponding to an accelerator depression amount is less than when the fuel economy priority mode is not set.

2. A hybrid vehicle comprising:
an engine configured to output power for traveling;
a motor configured to output power for traveling;
a switch configured to set a fuel economy priority mode, in which priority is given to fuel economy, and to cancel the fuel economy priority mode; and
a controller configured to:
(a) operate the engine and the motor based on the switch setting;
(b) determine whether or not a fuel supplied to the engine is degraded; and
(c) prohibit setting the fuel economy priority mode in response to operation of the switch after the controller determines that the fuel supplied to the engine is degraded,
wherein, when the fuel economy priority mode is set, the engine is not started before the electric power storage ratio of the battery reaches a predetermined threshold.

3. A control method for a hybrid vehicle, the hybrid vehicle including: an engine configured to output power for traveling; a motor configured to output power for traveling; a switch configured to set a fuel economy priority mode, in which priority is given to fuel economy and to cancel the fuel economy priority mode; and a controller,
the control method comprising:
operating the engine and the motor by the controller based on the switch setting;
determining, by the controller, whether or not a fuel supplied to the engine is degraded; and
prohibiting, by the controller, setting the fuel economy priority mode in response to operation of the switch after the controller determines that the fuel supplied to the engine is degraded,
wherein, when the fuel economy priority mode is set, an amount of a required torque corresponding to an accelerator depression amount is less than when the fuel economy priority mode is not set.

4. A control method for a hybrid vehicle, the hybrid vehicle including: an engine configured to output power for traveling; a motor configured to output power for traveling; a switch configured to set a fuel economy priority mode, in which priority is given to fuel economy and to cancel the fuel economy priority mode; and a controller, the control method comprising:

operating the engine and the motor by the controller based on the switch setting;

determining, by the controller, whether or not a fuel supplied to the engine is degraded; and prohibiting, by the controller, setting the fuel economy priority mode in response to operation of the switch after the controller determines that the fuel supplied to the engine is degraded, wherein, when the fuel economy priority mode is set, the engine is not started before the electric power storage ratio of the battery reaches a predetermined threshold.

* * * * *